United States Patent [19]

Ferguson et al.

[11] Patent Number: 4,640,856

[45] Date of Patent: Feb. 3, 1987

[54] MULTI-LAYER PACKAGING FILM AND RECEPTACLES MADE THEREFROM

[75] Inventors: Daniel J. Ferguson; Henry G. Schirmer, both of Spartanburg; Walter B. Mueller, Inman, all of S.C.

[73] Assignee: W. R. Grace & Co., Cryovac Div., Duncan, S.C.

[21] Appl. No.: 728,428

[22] Filed: Apr. 29, 1985

[51] Int. Cl.$^4$ ............................................. B32B 27/08
[52] U.S. Cl. ....................................... 428/36; 428/35; 428/516; 428/518; 428/520; 428/910
[58] Field of Search ................... 428/35, 36, 516, 518, 428/520, 910

[56] References Cited

U.S. PATENT DOCUMENTS

| | | | |
|---|---|---|---|
| 3,821,182 | 6/1974 | Baird, Jr. et al. | 161/198 |
| 4,048,428 | 9/1977 | Baird, Jr. et al. | 428/518 |
| 4,112,181 | 9/1978 | Baird, Jr. et al. | 428/518 |
| 4,161,562 | 7/1979 | Yoshikawa et al. | 428/518 |
| 4,364,981 | 12/1982 | Horner et al. | 428/35 |
| 4,379,117 | 4/1983 | Baird, Jr. et al. | 428/518 |
| 4,399,180 | 8/1983 | Briggs et al. | 428/516 |
| 4,424,243 | 1/1984 | Nishimoto et al. | 428/518 |
| 4,430,377 | 2/1984 | Yoshimura et al. | 428/518 |
| 4,456,646 | 6/1984 | Nishimoto et al. | 428/216 |
| 4,457,960 | 7/1984 | Newsome | 428/35 |
| 4,469,742 | 9/1984 | Oberle et al. | 428/516 |

FOREIGN PATENT DOCUMENTS 0120503  3/1984  European Pat. Off. .

OTHER PUBLICATIONS

Plastics Technology, Sep. 1984, p. 113 and Oct. 1984, pp. 13–15.
Plastics World, Oct. 1984, p. 86.
European Plastics News, Dec. 1984.

*Primary Examiner*—John E. Kittle
*Assistant Examiner*—James J. Seidleck
*Attorney, Agent, or Firm*—John J. Toney; William D. Lee, Jr.; Mark B. Quatt

[57] ABSTRACT

Improved shrink, toughness and barrier properties are achieved by a multi-layer, thermoplastic, shrink film having a substrate layer of very low density polyethylene and a gas barrier layer of vinylidene chloride copolymer or ethylene-vinyl-alcohol. The film is particularly useful for making bags for packaging large cuts of fresh red meat.

18 Claims, No Drawings

MULTI-LAYER PACKAGING FILM AND RECEPTACLES MADE THEREFROM

FIELD OF THE INVENTION

This invention relates to thermoplastic packaging films and receptacles such as pouches, bags, and casings made therefrom. In particular, this invention relates to plastic films and bags which are heat shrinkable and have improved shrink, tear, barrier and puncture resistance properties.

BACKGROUND OF THE INVENTION

Shrinkable thermoplastic films having a gas barrier have found many useful applications in packaging of meats, cheeses, poultry, and numerous other food and non-food products. There is always the search for improvement in these films to make them have better barrier properties, better abuse resistance, better tear resistance, improved clarity, and easier handling. One film of this type is a multi-layer film having layers of polyethylene/saran/polyethylene which is disclosed in U.S. Pat. No. 3,821,182 which issued on June 28, 1974 to William G. Baird, Jr. et. al. The shrink and abuse resistance of such a film is improved by irradiating the film to cross-link the polyethylene layers prior to heating and orienting the film by the trapped bubble technique.

Another film laminate that has been quite successful is that disclosed in U.S. Pat. No. 3,741,253 which issued on June 29, 1973 to Harri J. Brax et. al. Disclosed in this patent is a multi-ply laminate which has a first layer of cross-linked ethylene-vinyl acetate copolymer directly joined to a middle layer of a copolymer of vinylidene chloride which is joined to another ethylene-vinyl acetate copolymer layer. The ethylene-vinyl acetate copolymer (hereinafter EVA) layer has improved properties over the previously used polyethylene and, in the extrusion coating method used to produce the multi-layer film according to the Brax et. al. patent, the substrate EVA layer is preferably cross-linked by irradiation before the saran layer is extrusion coated thereon thus avoiding irradiation of the saran layer. Saran (vinylidene chloride copolymer) tends to discolor under high energy irradiation.

An alternate and successful multi-layer film where a hydrolyzed ethylene-vinyl acetate copolymer is used as a barrier layer instead of saran is disclosed in U.S. Pat. No. 4,064,296 which issued on Dec. 29, 1977, to Norman D. Bornstein et. al. A heat shrinkable multi-layer film is formed by coextruding the hydrolyzed ethylene-vinyl acetate copolymer (sometimes abbreviated "HEVA" or called ethylene-vinyl alcohol and abbreviated "EVAL" or "EVOH".) Since EVOH does not suffer from the effects of radiation a coextruded product such as EVA/EVOH/EVA can readily be cross-linked by irradiation before orientation.

Another way of improving the performance of packaging films has been to blend various polymers. In U.S. Pat. No. 3,090,770 which issued on May 21, 1973 to Razmic S. Gregorian, the blending of cross-linked polyethylene with non-cross-linked polyethylene is disclosed to improve the clarity of a film. Such blends were accomplished by using differing proportions of high, low and medium density polyethylene. This Patent also disclosed a cross-linked polyethylene; and, U.S. Pat. No. 3,118,866, which issued on Jan. 28, 1964 to the same inventor, is directed to an ethylene composition and the process of cross-linking by chemical means. The olefin polymers and copolymers have been particularly attractive because of low cost, availability, and wide range of satisfactory characteristics for packaging films.

Recently, the medium and low density linear polyethylenes have become commercially available and have begun to be used in a number of packaging applications. One of the early patents in this field is U.S. Pat. No. 4,076,698 which issued on Feb. 28, 1978 to Aurthur William Anderson and discloses an interpolymer composed of ethylene and monoalpha-olefinic hydrocarbons containing five to ten carbon atoms per molecule and the proportion of the mono-olefinic hydrocarbon being 3 to 7 percent of the weight of the interpolymer with a melt index from 0.3 to 20 and a density of 0.93 to 0.94. Linear polymers of this type are characterized by actually being an interpolymer or copolymer with another olefin and having a relatively straight molecular chain, that is, having a chain with no side branches or limited side branching. Low density versions of this type of film where density is in the range of 0.920 to 0.926 are produced by a low pressure process as opposed to the high pressure process which produces a branched, low density polyethylene. Linear low density polyethylene, abbreviated hereinafter as "LLDPE", has found many applications and uses as exemplified by U.S. Pat. No. 4,364,981 which issued on Dec. 21, 1982 to Jerome T. Horner and discloses an EVA/LLDPE/EVA structure as does also U.S. Pat. No. 4,399,180 which issued on Aug. 16, 1983 to William F. Briggs et. al. In U.S. Pat. No. 4,457,960 a multi-layer structure is disclosed of EVA/Saran/EVA-LLDPE-blend.

Still another polymeric material has more recently entered the market having different properties from the copolymers which comprise the LLDPE class of materials. These copolymers are known as very low density polyethylene (hereinafter abbreviated "VLDPE") and whereas conventional polyethylenes and LLDPEs have densities as low as 0.912, the VLDPE's currently on the market have densities below 0.910, specifically, 0.900 to 0.906, and it is thought that densities as low as 0.860 will be forthcoming. European patent application No. 120,503 (Union Carbide) has been published disclosing a method of making VLDPE. In "Plastics Technology" magazine for September 1984 at page 113, a news item entitled "Introducing Very Low Density PE" briefly described some of VLDPE's properties and stated that it's what the manufacturer "Calls an entirely new class of polyethylene, consisting of linear copolymers that can be produced at densities down to 0.89 or lower. What makes them special is an unique combination of properties in between those of standard PE's and polyolefinic rubbers". In the October 1984 issue of "Plastics Technology" at page 13 another article appeared entitled "New Kind of Polyethylene Combines Flexibility, Toughness, Heat Resistance". This article lists a number of the properties of VLDPE and compares them with EVA and states that uses for this material is for squeeze tubes, bottles, hoses, tubing, drum liners and film. VLDPE is also listed as having potential as an additive. It is expected to be used as a blending resin in high density polyethylene, polypropylene, EVA, and some EPR's, with all of which VLDPE is compatible. According to the article, the first two commercially available grades are from Union Carbide and are designated "DFDA-1137 NT7", which has a narrow molecular weight distribution, higher toughness, clarity, and gloss and FDA clearance for food contact. The other resin is DFDA-1138 which is aimed particularly at film, has a broad molecular weight distribution, and is superior in processability. On page 15 in the same article, it is stated that "the new resins have been injection molded, extruded, blow molded, and thermoformed on standard equipment". It is noted that blown film can be extruded on systems designed either for conventional LDPE or for LLDPE. However, the company generally recommends LLDPE-type screw designs in higher torque capability, especially with narrow-MWD grades. The article observes that the enlarged die gaps required by LLDPE are not required for VLDPE and that conventional blown film die gaps of 30–40 mil have proven satisfactory at blow up ratios of 2–3:1. For blown film, DFDA-1137 and 1138 are said to extrude much like 2-MI LLDPE or 0.5-MI LDPE. An article similar to the one in "Plastics Technology" appeared in the October 1984 issue of "Plastics World" at page 86.

In the above mentioned European patent application publication No. 120,503, published Oct. 3, 1984, a process for preparing very low density ethylene polymers in a fluidized bed is described. These ethylene polymers are classified as having a density of less than 0.91 grams per cubic centimeter and having a melt flow index which is preferably from 0.2 to 4.0.

Now, returning to the specific application of polymers to packaging film and receptacles made therefrom, a very successful and useful film is made according to the process shown in U.S. Pat. No. 3,741,253 mentioned above. A heat shrinkable bag can be made from such film which has wide application, particularly for meat, poultry, and dairy products. In fact, heat shrinkable polymeric films have gained rather wide spread acceptance for packaging meat, particularly fresh meat and processed meat. Bags made from the heat shrinkable film are supplied to a meat packer being sealed at one end with the other end open and ready to receive a meat product. After the cut of meat is placed in the bag, the bag will normally be evacuated and the open end of the bag closed by heat sealing or by applying a metal clip. This process is advantageously carried out within a vacuum chamber where the evacuation and application of the clip or heat seal is done automatically. After the bag is removed from the chamber it is heat shrunk by applying heat which process can be performed by immersing the filled bag into a hot water bath or conveying it through a hot air tunnel.

In the usual distribution chain, a whole primal or subprimal is packaged within shrink bags of this type. The meat within the bag will travel from a central slaughter house where it has been packaged to a retail supermarket where the bag will be opened and the meat will be cut for retail portions. Thus, the bags of this type must satisfy a number of requirements which are imposed by both the slaughter house or packing house and by the bag user. Furthermore, often the bag is placed in the show case at the retail supermarket for special promotions when a whole loin, for example, is to be sold to the consumer for his use. At this point, it is desirable to have an attractive package whereby there has been relatively complete shrinkage of the bag around the product so that the bag is not wrinkled and the blood and juices are not trapped in the folds of the wrinkles. Accordingly, it is one object of the present invention to provide a film and receptacle made therefrom which has improved shrink characteristics over bags used in the past.

Another important characteristic of a bag is the capability of the bag to physically survive the process of being filled, evacuated, sealed, closed, heat shrunk, boxed, shipped about the country, unloaded, and stored at the retail supermarket. This type of abuse rules out many polymeric films. Accordingly, it is another object of the present invention to provide a new combination of polymeric films which will withstand the abuse of packing, shipping, and storing.

Another feature required by bags used for the foregoing described application is that the bag must also be strong enough to survive the handling involved in moving package meat which may weigh 100 pounds or more or large chunks of cheese weighing 60 lbs. or more. In particular, when the chunk of meat or cube of cheese is pushed into the bag its bottom seal must withstand the force of the meat or cheese as it hits the seal. Also, in bags that are made by folding a sheet with the fold as the bottom of the bag and by sealing the sides, seal strength is quite an important factor. Accordingly, it is still another object of the present invention to provide a bag which has improved seal strength over previously available bags.

It is also very desirable for the bag to serve as a barrier against oxygen from the surrounding atmosphere which will detrimentally affect the fresh meat product. Accordingly, it is yet another object of the present invention to provide a flexible film product which will maintain during its packaging life time an effective barrier to gases and oxygen, in particular.

One of the more common hazards in packaging and distributing products in flexible packaging materials is the hazard of the material receiving a puncture which will release the vacuum inside the bag and allow oxygen to enter. Anything from the application of the clip to the presence of a bone in the meat can cause a puncture. Accordingly, it is an important object of the present invention to provide a film which has superior puncture resistance.

SUMMARY OF THE INVENTION

It has been found that the above mentioned objects are achieved by the present invention which, in one aspect, is a multi-layer, thermoplastic barrier film including a layer comprising very low density polyethylene (VLDPE) having a density of 0.906 grams per cubic centimeter or lower; a barrier layer comprising a material selected from the group consisting of: (1) copolymers of vinylidene chloride and (2) hydrolized ethylene-vinyl acetate copolymers; and a thermoplastic polymeric layer, said layer being on the side of the barrier layer opposite that of the layer comprising very low density polyethylene. The thermoplastic polymeric layer may advantageously comprise a material selected from the group consisting of: (a) ethylene polymers and copolymers and (b) blends of polymers and copolymers selected from group (a). A particularly advantageous thermoplastic polymeric layer is one which comprises ethylene-vinyl acetate copolymers or a very low density polyethylene. An unexpected result which the multilayer film of the invention gives is that while VLDPE has a high melting point, e.g., 244° F., it can be oriented out of hot water, i.e., below the boiling point of water and hence it will be shrinkable below the boiling point.

Such properties greatly enhance its usefulness in packaging applications.

In another aspect, the film of the present invention is a multi-layer thermoplastic barrier film including a layer comprising a very low density polyethylene; and a layer comprising a polymeric barrier material. Advantageously, the very low density polyethylene material may be cross-linked. A preferable method of cross-linking is to cross-link by irradiation although the material may be cross-linked by chemical means. Also, in certain instances where the barrier material is hydrolized ethylene-vinyl acetate copolymer, it may be advantageous to cross-link the barrier material.

In still another aspect, the present invention is a seamless tubular film made from any one of the multi-layer film combinations set forth above by a tubular or annular extrusion or coextrusion process.

In yet another aspect, the invention is a bag or pouch made from the film of the invention.

In a further aspect, the invention is a process for making a multi-layer, thermoplastic barrier film having a layer of very low density polyethylene by orienting it below 100° C. (212° F.) according to the process steps described hereinafter. A feature of this aspect of the invention is that the very low density polyethylene layer of the multi-layer film may be cross-linked. The invention also includes a thermoplastic, multilayer barrier film comprising a barrier layer, a layer of VLDPE, and a layer comprising a blend of VLDPE and LLDPE.

DEFINITIONS

The term "polyethylene" (PE) as used herein refers to a family of resins obtained by polymerizing the gas ethylene, $C_2H_4$. By varying the catalysts and methods of polymerization, properties such as density, melt index, crystallinity, degree of branching and cross-linking, molecular weight and molecular weight distribution can be regulated over wide ranges. Polyethylenes having densities ranging from about 0.915 to 0.925 are called "low density polyethylenes". Those having densities from about 0.926 to about 0.940 are called "medium density polyethylenes", and those having densities above about 0.940 are called "high density polyethylenes". (See "Whittington's Dictionary of Plastics, 1978). Molecules in conventional low density polyethylene are branched and linked in random fashion, those in the higher density polyethylenes are linked in longer chains with fewer side branches. Conventional low density PE is sometimes called branched low density PE.

The term "linear low density polyethylene (LLDPE)" as used herein refers to copolymers of ethylene with one or more co-monomers selected from $C_4$ to $C_{10}$ alpha olefins such as butene-1, octene-1, hexene-1, pentene-1, etc. in which the molecules thereof comprise long chains with few branches or cross-linked structures. This copolymer is sometimes called "low pressure", low density polyethylene thereby referring to the polymerization process which produces it. Preferably, the density should be maintained between 0.916 and 0.925.

The term "very low density polyethylene" as used herein means linear PE copolymers having a density of less than 0.910 gm/cc and as low as 0.860 or even lower.

The term "ethylene-vinyl acetate copolymer" (EVA) as used herein refers to a copolymer formed from ethylene and vinyl acetate monomers wherein the ethylene units are present in a major amount and the vinylacetate units are present in a minor amount.

An "oriented" or "heat shrinkable" material is defined herein as a material which, when heated to an appropriate temperature above room temperature (to, for example 96° C.) will have a free shrink of 5% or greater in at least one linear direction.

DETAILED DESCRIPTION

A preferred method of making the film of the present invention is that according to the process outlined and described in U.S. Pat. No. 3,741,253 (Brax et. al.) which is incorporated herein by reference. In this process the first or substrate layer of the film is extruded through a conventional tubular extruder whose die is modified to handle very low density polyethylene resin to form a tubular tape or film. The preferred resin is "DFDA-1137 NT7" from Union Carbide Corporation which has a density of approximately 0.906 grams per cubic centimeter, a melt index of 0.721 grams/10 minutes, a melting point of 244° F., and is a butene based copolymer. The extrudate has a diameter of about 3½ inches with a wall thickness of 19 to 20 mils as it leaves the die. After leaving the die the substrate is cooled and flattened. At this point it may be sent through an irradiation vault where it will be irradiated by high energy electrons to a dosage of preferably about 4.5 MR. Depending on the characteristics desired, this dosage can vary from 2 to 20 MR. After leaving the irradiation vault the substrate is again inflated and sent through a first tubular extrusion coating die where it receives a coating of about 3.5 mils of vinylidene chloride copolymer. After receiving the coating of vinylidene chloride copolymer the still inflated and now double-walled film passes through a second tubular extrusion coating die where it receives a layer of about 5.0 mils of ethylene vinyl acetate copolymer which has a vinyl acetate content of about 5%. After receiving the final coating, the film is cooled, collapsed and rolled up. It is now a three layer tubular tape having a wall thickness of approximately 27.5 mils. This tape is subsequently unrolled, fed through a bath of hot water held at 205° to 210° F., preferably close to 210° F., and as it leaves the hot water it is inflated and blown into thin tubing where its wall thickness will be 2.4 mils. This is the trapped bubble technique which is well known in the art. The film is rapidly cooled to set the orientation and then rolled up for further processing.

It is quite surprising that the VLDPE having a melt temperature of 244° F. can be oriented at 205° F., particularly, when the VLDPE is the substrate of a barrier film. Normally, an olefin based polymer would be expected to orient at not more than 10° F. to 15° F. below its melting point. For example, in the above mentioned U.S. Pat. No. 3,741,253 the EVA has a melt point of about 205° F. and is oriented at about 190° F. Since films shrink at or near orientation temperature, this means that packages made from film according to the invention can be shrunk in hot water baths.

One further processing step can be taken to make end seal bags by transversely sealing and severing across the seamless tubular film as it is laid flat to make individual bags. Side sealed bags may be made by slitting the seamless tubular film along one of its edges after which it is transversely sealed and severed into bags. The side seals are the sealing and severing seams and the bottom of the bag is the unslit edge of the film. Other bag and pouch making methods known in the art may be readily adapted to making receptacles from the multi-layer film of the present invention.

The substrate film of very low density polyethylene may be extruded as a monolayer substrate or coextruded as a multi-layer substrate and then irradiated depending upon the desired characteristics of the final film. Furthermore, additional layers may be extrusion coated upon the inflated substrate so that films having 4, 5, and 6 or more layers may result.

An alternate method of manufacturing a film according to the present invention is to employ the method disclosed in U.S. Pat. No. 4,379,117 wherein the extruders feed to a common coextrusion die wherein the inner layer is VLDPE polymer, the center layer is a vinylidene chloride copolymer and the outer layer will be an ethylene vinyl acetate copolymer. This film can be blown into a tube immediately upon leaving the coextrusion die. If it is desired to irradiate all three layers of film, it is preferable to use EVOH in place of the vinylidene chloride copolymer layer as vinylidene chloride copolymers do not react well to radiation tending to turn an undesirable brownish color. Again, the film is not limited to three layers and will preferably be extruded in the form of an unstretched tape after which it is irradiated and then oriented by the same type trapped bubble technique as described above and shown and described U.S. Pat. No. 4,379,117.

Returning now to the process of U.S. Pat. No. 3,741,253, three runs were made which demonstrate the improved and unexpected results of using a VLDPE layer in conjunction with a vinylidene chloride copolymer (PVDC) layer to make an improved barrier film and receptacle.

In the control sample a film according to U.S. Pat. No. 3,471,253 was produced. The single substrate layer as disclosed in that patent is, in the control sample actually two layers, i.e., the two layers to the left of the PVDC film were coextruded and irradiated prior to receiving a coating of PVDC and followed by a coating of EVA. The layer construction with the thickness in mils of each layer is as follows:

| Control: | EVA/EVA/PVDC/EVA |
|---|---|
|  | 14.5/3.0/3.5/6.5 |

The two EVA layers to the left were irradiated to a dosage of 4.5 MR and represent the substrate. The tape was oriented from a hot water bath at 210° F. and stretched to a wall thickness of 2.4 mils by the trapped bubble technique.

EXAMPLE 1

The thicker substrate layer (14.5 mils) was DFDA-1137 NT7, a VLDPE resin from Union Carbide. The process used was the same as for the control sample and the layer construction was as follows having the same thicknesses as the control sample:
VLDPE/EVA/PVDC/EVA In this extrusion coating process, the EVA layer interposed between the VLDPE surface or skin layer and the PVDC layer is so placed to promote adhesion between the layers and to lessen any tendency of the film to delaminate as VLDPE does not adhere to PVDC as well as does EVA.

EXAMPLE 2

The second example was run in the same manner as the first example and the control sample except that both outer layers of the film were VLDPE DXFP-1137 resin. This structure was as follows:
VLDPE/EVA/PVDC/VLDPE The tapes produced in Examples 1 and 2 were oriented in the same manner as the control sample. The physical properties of the films are set forth in Table I below.

TABLE I

| Parameter | Control | Example 1 | Example 2 | Test Procedure |
|---|---|---|---|---|
| Tensile Strength (PSI) | | | | |
| Longitudinal | 8,490 | 8,430 | 11,300 | ASTM |
| Transverse | 10,920 | 10,750 | 11,090 | D882-81 |
| Elongation at Break (Percentage) | 206 | 277 | 314 | ASTM D882-81 |
| Tear Propagation at 73° F. (Grams) | | | | |
| Longitudinal | 22.75 | 480 | 258.75 | ASTM |
| Transverse | 21.0 | 240 | 265.5 | D1938-79 |
| Free Shrink at 190° F. (Percent) | | | | |
| Longitudinal | 37 | 33 | 38 | ASTM |
| Transverse | 51 | 48 | 47 | D2732-70 |
| Shrink Tension at 195° F. (PSI) | | | | |
| Longitudinal | 248 | 183 | 234 | ASTM |
| Transverse | 303 | 342 | 385 | D2838-81 |
| Ball Burst Impact at 73° F. (CM-KG) | 12.5 | 20.6 | 28.1 | ASTM D3420-80 |
| Optical Properties at 73° F. Haze (Percent) | 2.8 | 4.1 | 8.7 | ASTM D1003-61 |
| Water Vapor Transmission at 100° F. | | | | |
| Grams/24 hours, 100 sq. in. 100% RH | 0.76 | 0.49 | 0.48 | ASTM F 372 |
| (Gauge-mils) | (2.21) | (2.48) | (2.38) | |
| Oxygen Transmission at 73° F. | | | | |
| CC (STP/24 hours, sq. meter, ATM) | 39.2 | 31.3 | 26.4 | ASTM D3985-81 |
| (Gauge-mils) | (2.42) | (2.38) | (2.37) | |

The examples show a significant and unexpected improvement in ball burst strength which is directly related to the puncture resistance and is a highly desirable property in a film which will be used to package a wide variety of irregular articles, particularly those which may contain bones and will be subjected to a variety of abusive conditions.

Another unexpected and beneficial result is the fact that there was a reduction in the oxygen transmission rate so that the film of Examples 1 and 2 demonstrate improved barrier properties. Normally, one would not expect the substitution of a lower density material (VLDPE) for a higher density one (EVA) to result in a better barrier, particularly, since the polyethylenes, in general, have poor oxygen barrier properties as compared to saran, EVOH, nylon, etc.

The same result occurred with water vapor transmission in that it was lowered by the substitution of the lower density VLDPE layers for the higher density EVA layers.

Furthermore, both films containing VLDPE layers showed improved elongation before breakage took place thus indicating the film will stand more abuse before rupturing or tearing.

And, as stated above, a very surprising and unexpected result was that the VLDPE, having a melt point of 244° F., could be oriented out of a hot water bath some 40° F. below its melt point.

Based on the work done above, three layer films comprising the following structures can be made. The particular four layer structures made above in the control and in Examples 1 and 2 were made from a four extruder configuration using an EVA layer between the VLDPE and PVDC to promote layer-to-layer adhesion. Thus, all samples were run on the same equipment. The following examples can be made based on this work.

| | |
|---|---|
| Example 3: | VLDPE/PVDC/EVA |
| | (Inside      Outside tube wall) |
| | tube wall) |
| Example 4: | EVA/PVDC/VLDPE |
| | (Inside      (Outside tube wall) |
| | tube wall) |
| Example 5: | VLDPE/EVA/PVDC/VLDPE |
| | (Inside)      (Outside) |

In this structure it is preferred that the inside VLDPE and EVA layers be irradiated before the PVDC and outer VLDPE layers are coated thereon.

| | |
|---|---|
| Example 6: | VLDPE/Adhesive/PVDC/Adhesive/VLDPE |
| | (Inside)                    (Outside) |

This structure is preferred for maximum delamination protection. The adhesive can be an EVA of 10% or greater vinyl acetate content, a Plexar brand adhesive from Chemplex Company of Rolling Meadows, Ill., or a CXA brand adhesive from duPont Corporation of Wilmington, Del. The inside VLDPE and adhesive layers are preferably coextruded as a tube, cooled, flattened and irradiated while the remaining three layers are sequentially extrusion coated onto the substrate after it has been irradiated and inflated.

Example 7:

By coextruding according to the process of the above mentioned U.S. Pat. No. 3,821,182, which process is incorporated herein by reference, a preferred structure as follows may be obtained:

VLDPE/Adhesive/HEVA/Adhesive/VLDPE

Where the adhesives are selected as in Example 6 and the entire structure may be irradiated and oriented.

While the present invention has been described with reference to tubular coextrusion and stretching by the trapped bubble technique other methods of manufacture are available such as coextruding the multilayer film through a slot die and then stretching the film by use of tenter frames. In addition, in certain applications blends of VLDPE, LLDPE and/or EVA may be used to achieve desired properties.

Numerous layer combinations will become evident to those skilled in the art upon reading this disclosure. The scope of the invention is limited only by the following claims:

We claim:

1. A multi-layer, thermoplastic barrier film having at least three layers comprising:
   (a) a layer consisting essentially of very low density polyethylene having a density of less than 0.910 gms/cc;
   (b) a barrier layer comprising a material selected from the group consisting of: (1) copolymers of vinylidene chloride and (2) hydrolyzed ethylene-vinyl acetate copolymers;
   (c) a thermoplastic polymeric layer, said layer being on the side of the barrier layer opposite to that of layer (a); and,
   (d) the shrinkage of layer (a) controlling the shrinkage of the entire multi-layer barrier film, said multi-layer film having been oriented and rendered heat shrinkable at a temperature below 100° C. (212° F.), said orientation temperature being about 40° F. or more below the melt temperature of said very low density polyethylene.

2. The film of claim 1 wherein the thermoplastic polymer of layer (c) comprises a material selected from the group consisting of: (1) ethylene polymers and copolymers, and (2) blends of polymers or copolymers selected from group (1).

3. The film of claim 2 wherein layer (c) comprises an ethylene-vinyl acetate copolymer.

4. The film of claim 2 wherein layer (c) comprises a very low density polyethylene.

5. The film of claim 2 wherein layer (c) comprises a linear low density polyethylene.

6. The film of claim 2 wherein layer (c) comprises a blend of a linear low density polyethylene and a very low density polyethylene.

7. The film of claim 1 wherein said film is in the form of a seamless tube with layer (a) being the face of the inner tube wall.

8. The film of claim 1 wherein the material of layer 1 has been cross-linked.

9. The film of claim 8 wherein the material of layer 1 has been cross-linked by radiation.

10. A bag formed from tubular film according to claim 7 wherein the bottom of the bag is formed by a transverse seal across the flattened tube and the mouth is formed by severing the tube at a pre-selected distance from said transverse seal.

11. A multi-layer thermoplastic barrier film comprising:
   (a) at least one layer consisting essentially of a very low density polyethylene having a density of less than 0.910 gms/cc and a melt temperature of about 244° F., said layer or layers of very low density polyethylene comprising at least 65% of the thickness of said multi-layer film; and, said very low density polyethylene layer being orientable below the boiling point of water;
   (b) a layer comprising a polymeric barrier material; and,
   (c) a thermoplastic polymeric layer comprising a material selected from the group consisting of: (1) ethylene polymers and copolymers, and (2) blends of polymers or copolymers selected from group (1).

12. The film of claim 11 wherein the very low density polyethylene is cross-linked.

13. The film of claim 11 wherein the thermoplastic barrier material is cross-linked.

14. The multi-layer film of claim 11 wherein an adhesive layer is interposed between the barrier layer and the layer of very low density polyethylene.

15. The multi-layer film of claim 11 wherein said film comprises at least five layers in which the center layer comprises a barrier material, the layers on each side of the barrier layer comprise an adhesive, and the surface layers comprise very low density polyethylene.

16. The film of claim 15 wherein the film has been formed by coextrusion.

17. The film of claim 15 wherein at least one layer is a cross-linked substrate layer upon which subsequent have been extrusion coated.

18. A side-sealed bag formed from the film of claim 11, said film being folded so that the fold forms the bottom of the bag and side seals close the side of the bag.

* * * * *